United States Patent Office 2,928,088
Patented Mar. 8, 1960

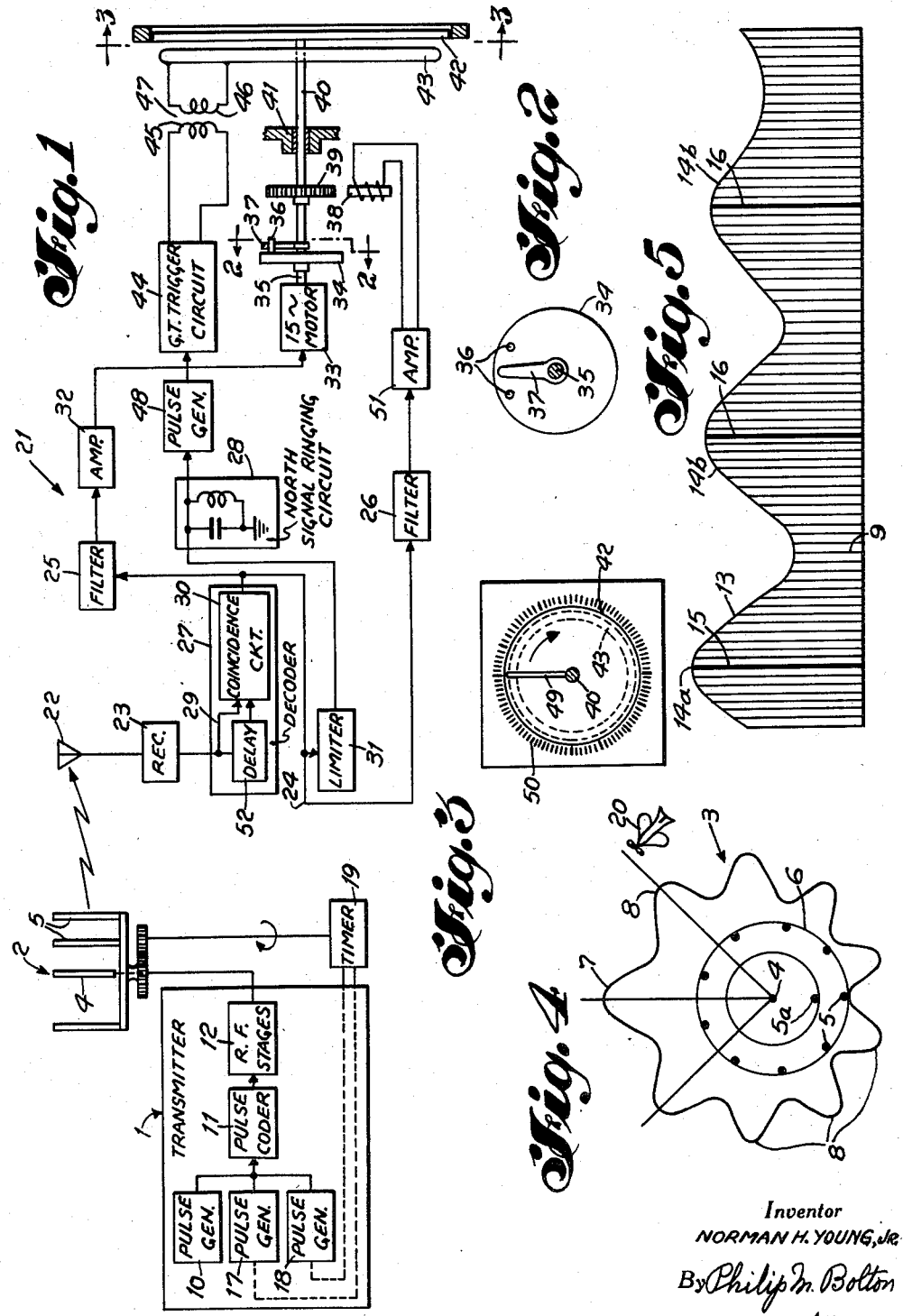

2,928,088

DIRECTION-FINDING SYSTEM WITH PHASE COMPARING AND INDICATING SYSTEM

Norman H. Young, Jr., Nutley, N.J., assignor to International Telephone and Telegraph Corporation, Nutley, N.J., a corporation of Maryland Application November 8, 1957, Serial No. 695,348

9 Claims. (Cl. 343—106)

The present invention relates to a direction-finding system and to a novel phase comparing and indicating system employed therein.

In certain direction-finding systems, coarse and fine bearing information is received from a beacon and applied to an indicator to indicate direction. In many of these systems, this directional indication depends essentially on a phase comparison of reference signals with signals whose phase varies at different azimuthal angles from the beacon. A typical system of this kind is a system known as Tacan. In this system, coarse information is given by radiating pulses according to an asymmetrical radiation pattern having a main lobe which is rotated at a fundamental frequency, such as 15 c.p.s., and emitting a main reference signal each time the main lobe passes a given reference direction, such as north. In an airplane receiver, the modulation envelope on the pulses due to this rotation is compared in phase with the main reference signal to give a coarse azimuth indication. Information for a finer indication is provided by having said rotating pattern include a number of minor lobes and emitting an auxiliary reference signal each time one of said minor lobes passes said given reference direction. In the airplane receiver, the higher frequency modulation waveform produced by the minor lobes is compared with the auxiliary reference signals and a fine azimuth indication is obtained.

Although the present airborne bearing azimuth indicating system in Tacan has many advantages, it is somewhat complex requiring phase comparison devices, phase shifters, a gear train and a servo system as well as an indicator. Furthermore, in this direction-finding system, in order to lessen the effects of a high noise-to-signal ratio as well as to make the system less subject to jamming, rather critical design is required in many portions of the system such as in the main reference signal separating circuitry, as well as in the filters which separate the main lobe modulation envelope and the minor lobe modulation envelopes.

Due to the complexity of this direction-finding indication system, it is relatively expensive and not basically designed for small aircraft, such as private flying craft where expense is a material consideration. Moreover, in addition to the problem of costs, the necessity for conserving space and weight which are at a premium in such smaller craft, militate against the adoption of such complex equipment for private planes.

An object of the present invention is the provision of an improved direction-finding indicator system. Features of this improved system include greater simplicity, less expense, and smaller volume.

Another object of the present invention is the provision of such a system in which the effects of noise and other interferences are minimized.

In the indicator system according to the present invention, a novel indicator is employed enabling the elimination of phase shifters, phase comparison circuits and the servo loops used in the present Tacan system and other similar arrangements.

A further object of the present invention is the provision of an improved indicator and indicator system, particularly one adapted for use generally as a phase comparator and specifically to provide the phase comparison required in certain navigation systems.

Other and further objects of the present invention will become apparent, and the foregoing will be better understood with reference to the following description of embodiments thereof, reference being had to the drawings, in which:

Fig. 1 is a simplified block diagram of a Tacan beacon transmitter, mobile receiver and indicator system of my invention;

Fig. 2 is a sectional view of the disk and pin arrangement;

Fig. 3 is a detailed view of the slotted disk through which the line of sight indicating direction appears;

Fig. 4 is a diagram of the radiation pattern of the antenna of the beacon; and

Fig. 5 is a curve showing the effective amplitude modulation envelope of the pulses transmitted from the beacon.

Referring now to Fig. 1, a beacon station 1 emits pulses from its rotating antenna 2 according to a multilobed directional pattern 3, such as shown in Fig. 4. The pattern is rotated at the rate of 15 cycles per second. The antenna system may consist of a central omnidirectional antenna 4 with passive reflectors 5 spaced thereabout at 40 degrees separation, and an additional single reflector 5a, the reflectors being, for example, printed on a pair of cylinders 6 which rotate around the central radiator 4, the pattern consisting of a major lobe or directional configuration 7 produced by 5a with minor lobes 8 produced by reflectors 5 spaced every 40 degrees therefrom.

Semi-random pulses are generated by a pulse generator 10 (Fig. 1) in the beacon which may be, for example, a free-running multivibrator. These pulses 9 (see Fig. 5), generated at about 2700 per second before transmission, are applied to a pulse coder 11, which changes each single pulse into a pair of pulses spaced 12 microseconds. The pulses from the coder 11 are used to key or modulate a radio frequency (R-F) oscillator in a radio frequency (R-F) section 12 which may also include various amplifier stages. The R-F pulses are then fed to the antenna system 2 from whence they are emitted according to the directional pattern 3 of Fig. 4. The rotation of the antenna reflectors in effect produces an amplitude modulation envelope 13 (Fig. 5) on the pulses, with a maximum amplitude peak 14a corresponding to the maximum lobe 7 and the other peaks 14b corresponding to the minor lobes 8. The multilobed antenna pattern which is rotating at 15 c.p.s. produces a modulation envelope of 135 c.p.s. (nine lobes multiplied by 15 c.p.s.) on top of the fundamental of 15 c.p.s.

As the antenna system 2 rotates, each time the major lobe 7 passes a given reference direction, such as, for example, north, a reference pulse signal is emitted which is called hereinafter the "north" or "main" reference signal 15. While north signal 15 is shown as a solid black line in Fig. 5, it actually consists of a number of pulses closely spaced together in a unique pattern as described hereinafter. As each minor lobe 8 passes the reference direction, remembering that the minor lobes are spaced by 40 degrees from each other and from the north lobe, an "auxiliary" reference signal 16 is emitted. This, likewise, is shown in Fig. 5 as a solid black line, but actually consists of a unique series of pulses closely spaced together. The north reference signals 15 may be produced by a pulse generator 17 which produces 12 pulses separated by 30 microseconds, which pulses are applied to the pulse coder 11 thereby producing 12 pulse pairs or 24 pulses with the spacing between the pulses of a pair being 12 microseconds. The auxiliary reference signals 16 may be generated by a generator 18 producing a burst of 6 pulses, separated 24 microseconds apart (from leading edge to leading edge), which are fed from the generator 18 into the pulse coder 11 where the 6 pulses are then doubled to become 6 pairs of pulses or 12 pulses with a 12 microsecond spacing between adjacent pulses.

Generators 17 and 18 may consist of conventional pulse generators feeding tapped delay lines or ringing circuits to produce a desired number of pulses with the proper spacing for the north or auxiliary reference groups as described above. Suitable timing means 19, which can take any one of various forms well known in the art, may be associated with the antenna system 2 and pulse generators 17 and 18 to cause the north and auxiliary reference signals to be emitted at the proper time.

The emitted pulses are received on a receiver 21 located in a mobile vehicle 20 (Fig. 4), such as, for example, an airplane. The signal is picked up on an omnidirectional antenna 22 and fed to a receiver 23, responsive to the R-F envelope which detects the signal to produce amplitude modulated pulse signals containing the following three components:

(1) The 15 c.p.s. envelope component.
(2) The 135 c.p.s. envelope component.
(3) The north or main reference signal component.

For the purposes of this invention, we can dispense with the detection of the auxiliary reference pulses.

The output of receiver 23 is fed into decoder 27, which consists essentially of a coincidence circuit 30 to which the input pulses are fed directly along line 29, the pulses, likewise, being fed to said coincidence circuit 30 through a delay device 52 having a delay of 12 microseconds. The coincidence circuit 30 produces an output when a delayed pulse coincides with an input pulse directly applied thereto. Various other arrangements for decoding the delay of one pulse with respect to the other will occur to those versed in the art.

The aforementioned components are separated as follows. The output of decoder 27 is fed via line 24 to two filters, 25 and 26. The 15 c.p.s. component, which is the component produced by the major lobe for each rotation, is separated from the amplitude modulated envelope by filter 25. The 135 c.p.s. component which is the component produced by the 40-degree minor lobe components, is separated from the amplitude modulated envelope by filter 26.

To separate the north or main reference signals, the output of decoder 27 is first fed to an amplifier and limiter circuit 31 which removes the audio amplitude modulation therefrom. The output of limiter 31 is then fed to a north signal ringing circuit 28, which is tuned to approximately 33 kilocycles to respond to the north signal pulses which are separated by 30 microseconds. Pulses whose spacing does not correspond to the repetition frequency to which the ringing circuit is tuned will not produce oscillations of sufficient amplitude to produce indications. For this purposes a threshold device may be incorporated in said ringing circuit or in the circuits to which their outputs are connected.

In accordance with the present invention, the phase comparing indicating system will receive both the 15 c.p.s. component to produce a relatively coarse indication of bearing, and in addition will receive the 135 c.p.s. component to produce a more accurate or finer indication of bearing. The phase comparing indicating system is arranged as follows. The 15 c.p.s. component derived from the modulation envelope by filter 25 is fed into a synchronous motor 33. This motor which rotates at 15 c.p.s. is used to drive a second shaft 40 through a loosely coupled transmission system which will be described hereinafter. A rotating indicator dial 42 is mounted and carried at the end of said second shaft 40. The loosely coupled transmission system consists of a driving disk 34 mounted on motor shaft 35 and having two limiting pins 36 on one of its sides between which an arm 37 is free to move. The arm 37 is carried on said second shaft 40. As synchronous motor 33 rotates, one of the limiting pins 36 drives arm 37 which in turn rotates second shaft 40. Arm 37 is free to assume any position between the pins 36 which are so spaced that in the given example the arm 37 is free to move within an angle of 40 degrees with respect to the instantaneous position of motor shaft 35.

The 15 c.p.s. signal component positions indicator dial 42 with respect to a given 40-degree sector which results in a coarse indication of bearing. A finer indication of bearing or, stated another way, a more accurate position of indicator dial 42 within said 40-degree sector will be obtained from the 135 c.p.s. component. This 135 c.p.s. component derived from the modulation envelope by filter 26 is fed to an electromagnet 38. This electromagnet 38 is magnetically coupled to a magnetic wheel 39 having nine teeth located on its periphery. The wheel and teeth are of soft iron or other material of high permeability and low retentivity. This magnetic wheel 39 is positioned adjacent to the electromagnet 38 and mounted on said second shaft 40 which is supported by any suitable bearing means 41. The energy from the 135 c.p.s. component will cause arm 37 to locate itself in the proper azimuth indicating position within the limiting pins 36 which subtend an arc of 40 degrees. That is, the wheel will tend to be positioned so that a tooth is nearest the pole of the electromagnet 38 at the instant the current through the electromagnet coil is maximum. The indicator dial 42 which is directly coupled to arm 37 through second shaft 40 will then move to this new position which results in a finer indication of bearing. The indicator dial 42 has a narrow slot 49 extending radially outward from its center as illustrated in Fig. 3. Behind the dial, there is a flashable illuminating means, such as a circular neon tube 43, whose time of flashing is controlled by the energy derived from the north or main signal ringing circuit 28. The output from the north or main signal ringing circuit 28 is applied to trigger a gas tube-type trigger circuit 44 through a pulse generator 48. The output of trigger circuit 44 will energize the primary 45 of a lighting transformer 47 whose secondary 46 is coupled to the illuminating means, circular neon tube 43, which may be best seen in an outline in Fig. 3. Calibration 50 surrounding said indicator dial will enable instantaneous readings of bearing. The position of the slot 49 located on indicator dial 42 at the time of flashing of the neon tube 43 will indicate the desired bearing information.

The phase comparing indicator system described above operates as follows. The 15 c.p.s. component drives motor 33 at 15 cycles per second. As the motor 43 rotates, it drives disc 34, and the limiting pins 36 thereon push arm 37 to rotate second shaft 40 at 15 c.p.s. It will be seen that while the motor 33 ultimately drives second shaft 40, shaft 40 is free to turn within an angle of 40 degrees independently of the motor shaft position. Thus, in effect, the 15 c.p.s. signal component only indicates bearing roughly within 40 degrees. It is within this 40 degrees that a fine adjustment is produced by the 135 c.p.s. signal component operating through the magnetic wheel arrangement which acts as an accelerator or brake in order to bring the phase of the rotating magnetic wheel and the indicator dial 42 more closely into step with the 135-degree information, thereby resulting in an increase of accuracy of the resulting azimuth display. This increased accuracy is due to the following. It will be seen that the 135 c.p.s. component varies through a complete cycle (or 360 degrees of phase shift) if the bearing of the airborne receiver with respect to the beacon varies 40 degrees. On the other hand, the phase of the 15 c.p.s. component varies only 40 degrees if the bearing of the airborne receiver with respect to the beacon varies 40 degrees. Thus a given change in phase in the 135-degree component represents one-ninth the change in bearing that the same change in phase in the 15 c.p.s. component would represent. Thus, the 135-degree information is much more accurate (by a factor of nine).

It should be noted that the 15 c.p.s. synchronous motor 33 must have sufficient torque to overcome the magnetic wheel drive arrangement and move the shaft 40 along in proper phase within 40 degrees to denote the proper 40-degree sector of bearing at the time of flashing of neon tube 43. The 135 c.p.s. component will of course further adjust the dial position so as to provide a more accurate positioning of the dial at the time of flashing. The time of flashing of the neon tube 43 is controlled by the output of the north or main signal ringing circuit 28, and thus of the north or main reference pulses. The indicator dial 42 is rotated as determined by the 15 or 135 c.p.s. signal components in synchronism with the rotation of the rotating beacon antenna 2 but angularly displaced therefrom as determined by the relative phase of said components with respect to the main reference signal. Since the phase of said components varies with respect to the main reference signal at different azimuth angles from the beacon, the angular displacement of the the slot at the time neon tube 21 is flashed will correspond to the given direction from the beacon from which the Tacan signal is being received.

While in the above description, means for loosely coupling the motor 33 to the indicator dial 42 is shown to indicate how the 135 c.p.s. signal component can modify the position of dial 42, it will be pointed out that other means for effecting this coupling may be employed.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for indicating the relative phase between a first regularly repetitive reference signal and second and third information bearing signals wherein the phase of the second signal with respect to the reference signal gives a coarse indication, and the phase of the third signal with respect to the reference signal gives a fine indication of the information being conveyed, and wherein the frequency of said third signal is a multiple of the frequency of said second signal and varies in phase, with respect to the first signal, in proportion to the ratio of their frequencies, comprising means responsive to said first signal for periodically producing a perceptible signal, a shaft, means responsive to said second signal for rotating said shaft at a rate determined by the frequency of said second signal, the instantaneous position of said shaft being determined by the phase of said second signal, means associated with said shaft and responsive to said third signal for varying said instantaneous position of said shaft in accordance with the phase of said third signal, the position of said shaft at the time the perceptible signal is given being indicative of the information being conveyed.

2. A system according to claim 1 wherein said means responsive to said second signal for rotating a shaft includes a motor controlled by said second signal and means loosely coupling the rotor of said motor to said shaft so as to allow relative angular movement between said shaft and said rotor over a predetermined number of degrees.

3. A system according to claim 1 wherein said means associated with said shaft includes an electromagnet, and a wheel mounted on said shaft having a number of teeth of magnetic material around its periphery equal to the ratio of the frequencies of said second and third signals, said third signal being applied to said electromagnet to create a field which is in phase with said third signal and which field operates on said wheel to vary the instantaneous position of said wheel and its shaft in dependence on the phase of said third signal.

4. A system according to claim 1 wherein said means for producing a perceptible signal comprises a light source periodically energized under the control of said first signal and a mask mounted on said shaft and having a narrow radial slot.

5. A system according to claim 4 further including a calibrated plate surrounding said mask.

6. A system for indicating the relative phase between a first regularly repetitive reference signal and second and third information bearing signals wherein the phase of the second signal with respect to the reference signal gives a coarse indication, and the phase of the third signal with respect to the reference signal gives a fine indication of the information being conveyed, and wherein the frequency of said third signal is a multiple of the frequency of said second signal and varies in phase, with respect to the first signal, in proportion to the ratio of their frequencies, comprising means responsive to said first signal for periodically producing a perceptible signal, a synchronous motor driven by said second signal, a first shaft driven by said motor, a second shaft, and means loosely coupling said first and second shaft comprising a pair of limiting pins carried by one of said shafts and an arm carried by another of said shafts, the arm extending between said limiting pins so that the first shaft and second shaft can move relative to each other through an angle which bears the same ratio to 360 degrees as the frequency of said second signal bears to the frequency of said third signal, a magnetic wheel mounted on said second shaft, said wheel containing a number of magnetic teeth around its periphery equal to the ratio of the different frequencies of said second and third signals, an electromagnet adjacent said wheel, means for applying said third signal to said electromagnet to create a field which is in phase with said third signal and which varies the instantaneous position of said wheel to thereby vary the instantaneous position of said second shaft in accordance with said third signal.

7. In a direction finding receiver for receiving signals in which a first regularly repetitive signal is a reference signal and second and third regularly repetitive signals vary in phase with respect to said reference signal at different azimuthal angles from a beacon, with the variation in phase of said second and third signals varying according to the ratio of their frequency, said second and third signals being harmonically related; an indicator system comprising means responsive to said first signal for periodically producing a perceptible signal, a shaft, means responsive to said second signal for rotating said shaft at a rate determined by the frequency of said second signal, the instantaneous position of said shaft being determined by the phase of said second signal, means associated with said shaft and responsive to said third signal for varying said instantaneous position of said shaft in accordance with the phase of said third signal, the position of said shaft at the time the perceptible signal is given being indicative of the direction of said receiver with respect to said beacon.

8. In a direction finding system having a beacon transmitting a plurality of signals consisting of a complex wave having as components thereof a first regularly repetitive signal of constant phase, a second repetitive signal, and a third repetitive signal of a frequency harmonically related to that of said second repetitive signal, with the phase of said second and third signals varying with respect to that of said first signal at different azimuthal angles with respect to said beacon, the relative variation of phase of said second to said third signals at different azimuthal angles being proportional to their relative frequencies; a receiver comprising means for receiving and separating said first, second, and third signals, means responsive to said first signal for periodically producing a perceptible signal, a shaft, means responsive to said second signal for rotating said shaft at a rate determined by the frequency of said second signal, the instantaneous position of said shaft being determined by the phase of said second signal, means associated with said shaft and responsive to said third signal for varying said instantaneous position of said shaft in accordance with the phase of said third signal, the position of said shaft at the time the perceptible signal is given being indicative of the direction of said receiver with respect to said beacon.

9. In a guidance system, a beacon emitting signals according to a multilobed rotating directional radiation pattern with a main lobe producing a fundamental amplitude variation envelope on said emitted signals and a plurality of minor lobes producing a harmonic amplitude modulation envelope on said signals, said beacon having means for emitting a reference signal each time said main lobe passes a given direction, the phase of said envelops varying with respect to said reference signal at different azimuthal angles around said beacon; a receiver comprising means for receiving the signals from said beacon, means for separating the reference signal, the fundamental component and the harmonic component of the amplitude modulated signals, means responsive to said reference signal for periodically producing a perceptible signal, a shaft, means responsive to said fundamental signal for rotating said shaft at a rate determined by the frequency of said fundamental component signal, the instantaneous position of said shaft being determined by the phase of said fundamental signal, means associated with said shaft and responsive to said harmonic component for varying the instantaneous position of said shaft in accordance with the phase of said harmonic component, the position of said shaft at the time the perceptible signal is given being indicative of the azimuthal position of said receiver with respect to said beacon.

References Cited in the file of this patent

UNITED STATES PATENTS

| | | |
|---|---|---|
| 2,564,703 | Litchford | Aug. 21, 1951 |
| 2,572,041 | Litchford | Oct. 23, 1951 |
| 2,614,237 | Goertz | Oct. 14, 1952 |